(12) United States Patent
Chen

(10) Patent No.: US 7,864,327 B1
(45) Date of Patent: Jan. 4, 2011

(54) IN-PHASE/IN-QUADRATURE DEMODULATOR FOR SPECTRAL INFORMATION OF INTERFERENCE SIGNAL

(75) Inventor: Dong Chen, Tucson, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 189 days.

(21) Appl. No.: 12/351,639

(22) Filed: Jan. 9, 2009

(51) Int. Cl.
*G01B 9/02* (2006.01)
*G01B 11/02* (2006.01)
*G01J 3/45* (2006.01)

(52) U.S. Cl. ...................... 356/456; 356/497
(58) Field of Classification Search ................. 356/451, 356/456, 479, 497
See application file for complete search history.

(56) References Cited

U.S. PATENT DOCUMENTS

2003/0023153 A1* 1/2003 Izatt et al. ................... 600/407
2004/0196468 A1* 10/2004 Wang et al. .................. 356/495
2004/0252393 A1* 12/2004 Wang et al. ................... 360/25
2005/0185187 A1* 8/2005 Dorrer ........................ 356/450

* cited by examiner

*Primary Examiner*—Patrick J Connolly
(74) *Attorney, Agent, or Firm*—Antonio R. Durando

(57) ABSTRACT

Sinusoidal in-phase and in-quadrature signals at a given spatial frequency are combined with the irradiance signals generating a correlogram of interest and integrated over the length of the correlogram data-acquisition scan. The integration outputs are then used to calculate the amplitude and the phase of the correlogram signal at the selected spatial frequency, thereby producing targeted spectral information. The signal generator used to generate the in-phase and in-quadrature sinusoidal signals may be scanned advantageously through any desired range of spatial frequencies, thereby producing corresponding amplitude and phase spectral information for the correlogram. Because the procedure produces spectral information independently of the number of data frames acquired during the interferometric scan, it is materially more rapid than conventional FFT analysis.

14 Claims, 8 Drawing Sheets

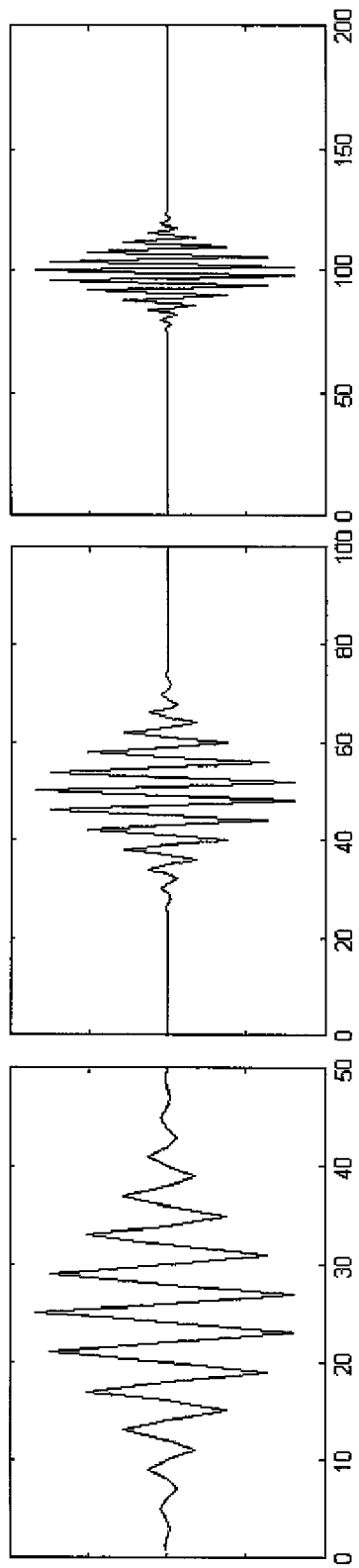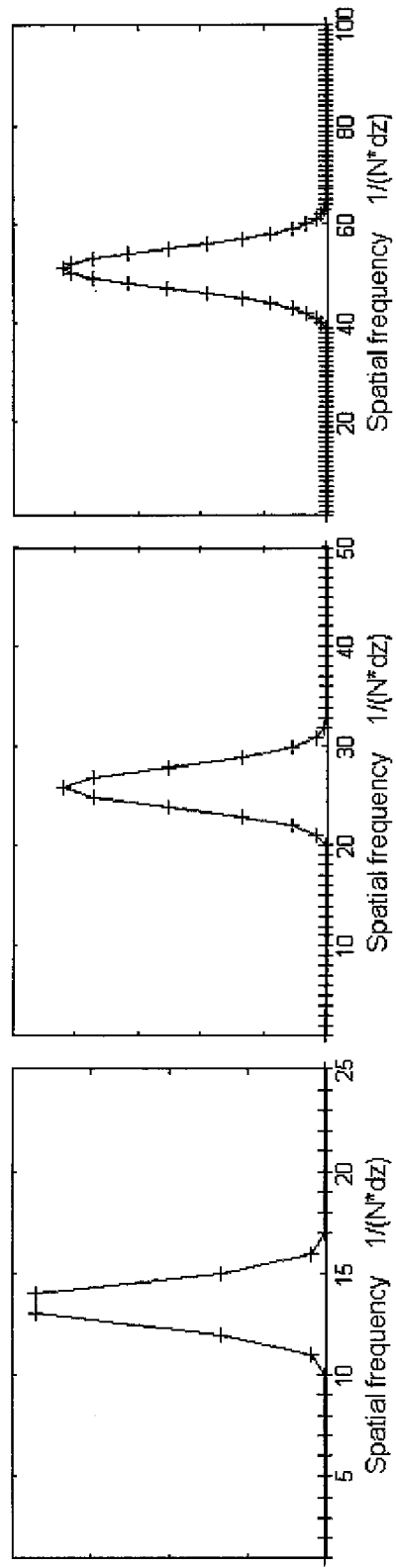
FIG. 3(A)   FIG. 3(B)   FIG. 3(C)

IN-PHASE/IN-QUADRATURE DEMODULATOR FOR SPECTRAL INFORMATION OF INTERFERENCE SIGNAL

BACKGROUND OF THE INVENTION

1. Field of the Invention

This invention relates in general to white-light interferometry (WLI) techniques for surface characterization. In particular, it relates to a new method for extracting spectral information from an interference signal.

2. Description of the Related Art

The raw data from a white-light interferometer typically consist of an array of data sequence, the so-called correlograms. Each correlogram is a series of equally spaced light intensities recorded in a light detector as the objective lens of an optical interferometer scans across the zero optical path difference (OPD) point of the measurement light to produce various degrees of contrast. These light intensities result from two light beams interfering at a pixel of the detector. One beam is reflected from a sample surface and the other beam from a reference mirror. Those skilled in the art readily understand that many variations of this general description are possible; however, the optical principle is the same. FIG. 1 illustrates a typical correlogram.

In its physical nature, a correlogram is the product of wavefronts with different wavelengths in the source spectrum superposing at different phase shifts through the zero OPD position. In other words, light beams with different wavelength and intensity add together through the zero OPD position to form the correlogram, as illustrated in detail in FIGS. 2(a)-(c). FIG. 2(a) shows a Gaussian-shaped spectrum of a light source (i.e., the intensity distribution as a function of wavelength—$\lambda 1$ to $\lambda 7$ are illustrated). FIG. 2(b) shows the corresponding interference fringes produced by the different wavelengths in the spectrum (offset for clarity). FIG. 2(c) shows the superposition of all spectrum fringes, forming a correlogram with maximum contrast at the zero OPD position for the white light of FIG. 2(a) used to produce the correlogram.

For a simple reflective sample surface, the main parameters of interest in the correlogram are the envelope peak position $z_0$ (i.e., the maximum fringe contrast position—see FIG. 1) and the corresponding fringe phase $\Phi$. In as much as $z_0$ is the zero OPD position for a given pixel, values of $z_0$ from an array of pixels form a map $z_0(x_i, y_j)$ of the surface height. The corresponding phase values $\phi(x_i, y_j)$ form the so-called $2\pi$ (or phase) map.

For a more complex surface structure, such as a thin film stack, a structure with sub-wavelength patterns or roughness, composite materials, and so on, the reflected light spectrum and correspondingly the shape of the correlograms will change from the straightforward illustration of FIG. 1. In other words, the spectrum of the light captured at the detector, both in terms of spectral irradiance and spectral phase, will change to reflect the characteristics of the sample surface. Information regarding structural and material properties of the sample surface is embedded in the reflected light spectrum captured in the correlograms recorded at the detector. Thus, by analyzing the reflected spectral information, sample surface properties can be obtained. See, for example, Seung-Woo Kim and Gee-Hong Kim, who teach a method for profiling thin-film layers using spectral analysis ("*Thickness-profile measurement of transparent thin-film layers by white-light scanning interferometry*," Applied Optics, Vol. 38, No. 28, 1999, p. 5968) and T. Yatagai, who details a spectral analysis technique for profilometry as well as for measurement of material dispersion ("*Recent Progresses in White Light Interferometry*," SPIE Vol. 2340, 1994, p. 338).

As detailed, for example, in U.S. Pat. No. 5,398,113, a typical way of obtaining spectral information (amplitude and phase) from a correlogram is through the use of Fourier transforms (FT). As generally described, the Fourier Transform $S(k)$ of a correlogram is given by the relation $$S(k) = \int_{-\infty}^{+\infty} C(z)\exp(ikz)\,dz \tag{1}$$

where $C(z)$ is the irradiance of the correlogram at position z and k is the spatial frequency of the interference fringe for a given spectral component of the light source. In WLI, $C(z)$ values are collected at discrete scanning locations with j=1, 2, 3 ... N. Therefore, the Fourier transform becomes a discrete Fourier transform (DFT), $$S(k) = \sum_{j=1}^{N} C(z_j)\exp(ikz_j); \quad (z_j = j\Delta z). \tag{2}$$

The limit on spatial frequency for data acquisition purposes is given by the so called Nyquist critical frequency, i.e.

$$k_C = \frac{1}{2\Delta z}, \tag{3}$$

where $\Delta z$ is the sampling interval (i.e., the scanning step size) for the data producing the correlogram. (Note that the sampling interval limits the maximum spatial frequency, or the bandwidth, not the frequency resolution).

As is well detailed in the prior art [see, for example, U.S. Pat. No. 7,106,454 (de Groot et al.) and U.S. Publication No. 2007/0091318 (Freishlad et al.)], an effective algorithm to calculate the DFT is the so-called fast Fourier transform (FFT), which transforms a sequence of N real numbers $C_1 C_2, \ldots C_N$ into a sequence of N complex numbers $S_1, S_2, \ldots S_N$ (in WLI, the correlogram data sequence is usually real numbers), as follows:

$$S(k_m) = \sum_{j=1}^{N} C(z_j)\exp(ik_m z_j); \quad (m = 1, 2, 3 \ldots N). \tag{4}$$

In the spatial frequency domain, the spectral interval (spectral resolution) $k_m$ is limited by the total length of the number sequence $C_1, C_2, \ldots C_N$ in the range of scan $N\Delta z$; i.e., $$k_m = \frac{m}{N\Delta z}; \quad m = -\frac{N}{2} \ldots \frac{N}{2}. \tag{5}$$

That is, the spectral resolution $\Delta k$ is given by $$\Delta k = \frac{1}{N\Delta z}. \tag{6}$$

FIGS. 3(a)-(c) illustrate this point by showing three correlograms and the corresponding FFT amplitudes for data-sequence lengths of 50, 100, and 200 frames, respectively (only positive frequencies are shown for simplicity of illustration, the negative frequencies being conjugate).

From the above and the illustration of FIG. 3 one can see that when FFT is used a desirable spatial frequency resolution can be obtained only with a large data window in the correlogram sequence even though the interference signals appear only in a small portion of the data sequence [see FIG. 3(c)]. This means that insufficient frequency information may result from a scan that does not cover a large enough window around the peak of modulation and, consequently, that a much longer scan than needed to generate the correlogram has to be carried out in order to obtain the desired spectral information. This feature, of course, increases the time required for performing the scan and for data acquisition and processing. Therefore, it would be very desirable to have an algorithm that did not require data acquisition beyond what is necessary for meaningful WLI analysis. The present invention achieves this objective using an in-phase/in-quadrature demodulation technique.

BRIEF SUMMARY OF THE INVENTION

The invention is based on the realization that combining the interference signals that produce a correlogram with an in-phase sinusoidal signal and a separate in-quadrature sinusoidal signal of a predetermined spatial frequency produces in-phase and in-quadrature integrated outputs from which the amplitude and phase at that frequency can be calculated. Accordingly, the invention consists of producing sinusoidal in-phase and in-quadrature signals at a given spatial frequency, combining these signals with the irradiance signals generating the correlogram of interest, and integrating each of the combined signals over the length of the correlogram data-acquisition scan. The integration outputs are then used to calculate the amplitude and the phase of the correlogram signal at the selected spatial frequency.

According to another aspect of the invention, the oscillators used to generate the in-phase and in-quadrature sinusoidal signals are scanned advantageously through any desired range of spatial frequencies, thereby producing corresponding amplitude and phase spectral information for the correlogram. These data can then be used in conventional manner to characterize the surface from which the correlogram was produced by interferometric measurement.

Because the procedure of the invention produces spectral information independently of the length of data frames acquired during the interferometric scan (so long as enough frames are acquired to produce an interferogram), the method is more rapid than conventional FFT analysis. In addition, the method enables the targeted determination of amplitude and phase data at any spatial frequency of interest.

Another advantageous feature lies in the fact that conventional WLI apparatus can be utilized with the algorithm of the invention to produce correlograms and corresponding spectral amplitude and phase information. The only necessary changes are in the components required to generate in-phase and in-quadrature sinusoidal signals, to combine them with correlogram signals and integrate them over the length of the scan producing the correlogram, and to process the outputs of integration to produce spectral amplitude and spectral phase data for spectral analysis of the correlogram.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose but a few of the various ways in which the invention may be practiced.

BRIEF DESCRIPTION OF THE DRAWINGS

FIGS. 3(a)-(c) show three correlograms and the corresponding FFT amplitudes for data-sequence lengths of 50, 100, and 200 frames, respectively.

DETAILED DESCRIPTION OF THE INVENTION

The term "intensity" is sometime used in the description of the invention interchangeably with the term "irradiance," as commonly done in the art, although it is recognized that the former more precisely refers to the light emitted by a source and the latter to the light illuminating a target. The term "quadrature" is used in the art to refer to a phase separation of 90° ($\pi/2$, or $\lambda/4$); thus, two oscillations are said to be "in quadrature" if they are separated in phase by degrees. The "signal generator" of the invention may be implemented in hardware as well as in software or other equivalent forms; therefore, all are intended to be covered by the claim language.

Figure 1:
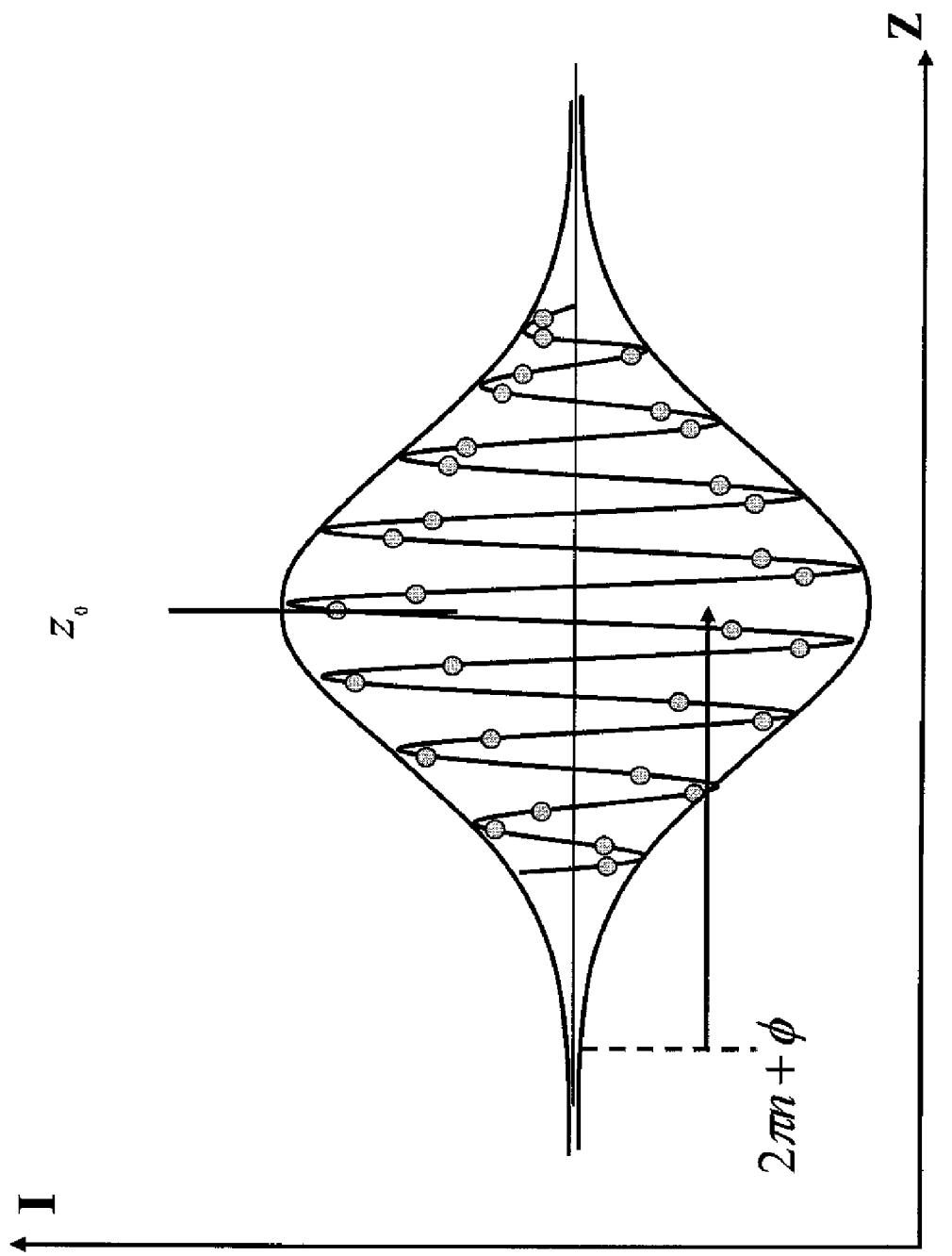
FIG. 1 is a typical correlogram illustrating the irradiance signal obtained during a white-light vertical scan as the OPD varies between the reference and the test beams of an optical interferometer.
Figures 2A, 2B, 2C:
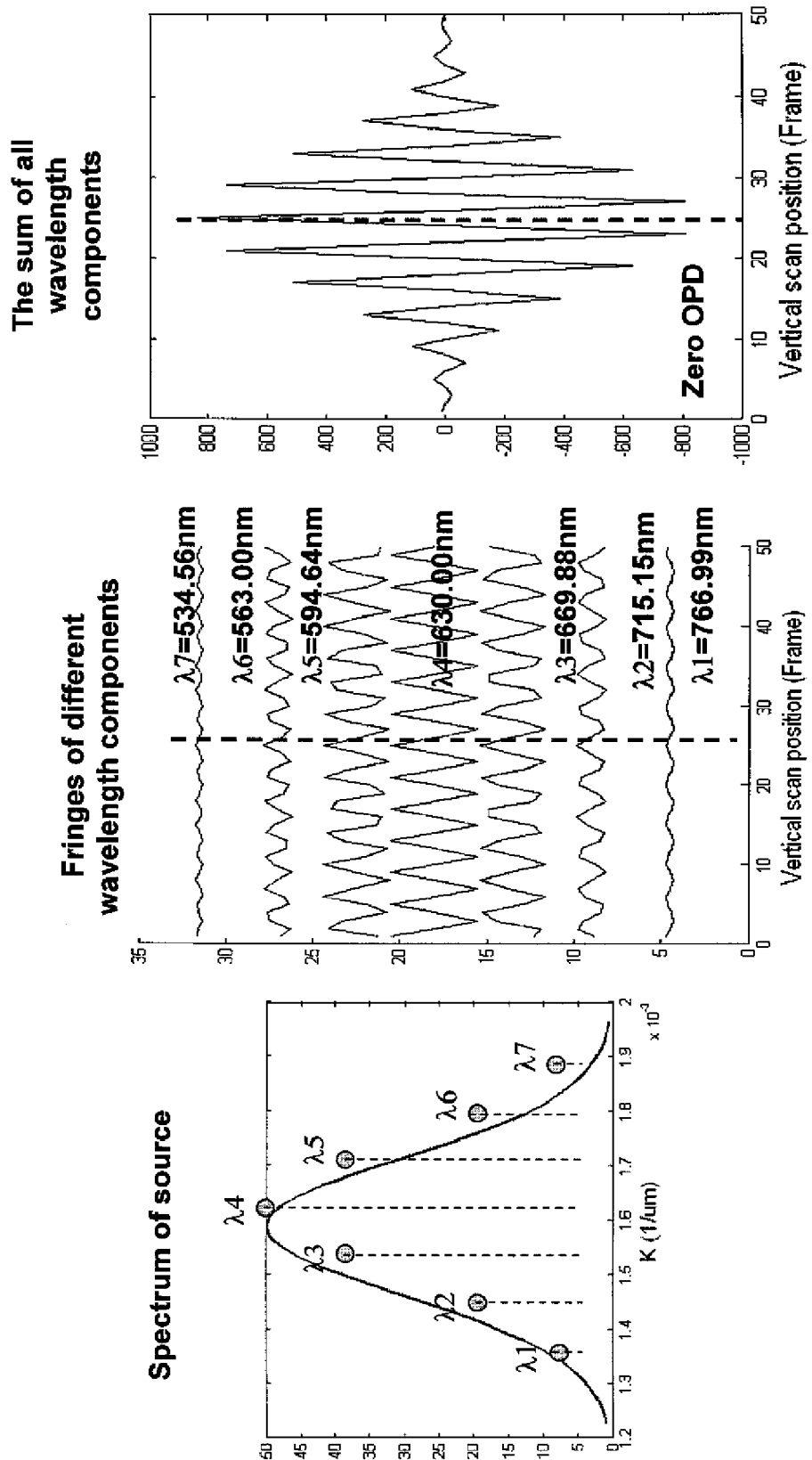
FIG. 2(a) shows the spectrum of a typical Gaussian shaped light source, expressed for illustration in arbitrary units of intensity (or irradiance).
FIG. 2(b) shows the interference fringes produced by the different wavelengths in the spectrum of FIG. 2(a), wherein the fringes are arbitrarily offset along the plot's ordinate for clarity of illustration.
FIG. 2(c) shows the superposition of all spectrum fringes of FIG. 2(b) forming a correlogram with maximum contrast at the zero OPD position for the white light of FIG. 2(a) used to produce the correlogram.
Figure 4:
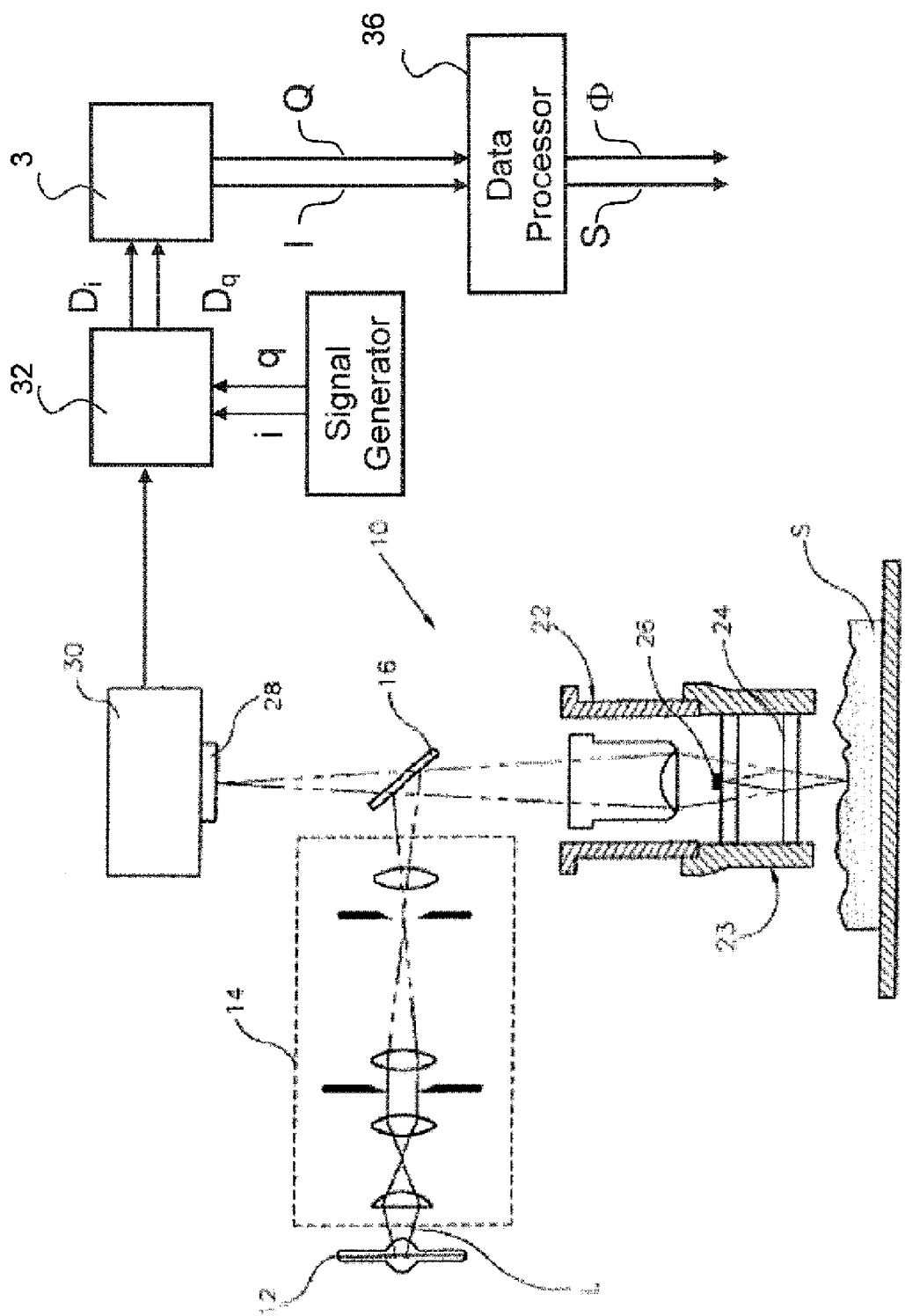
FIG. 4 is a schematic of a convention vertical-scanning interferometer for testing a sample surface, further including a signal generator, and mixing and processing means for combining the correlogram produced by the interferometer with in-phase and in-quadrature reference signals, integrating them over the length of the scan, and calculating amplitude and phase information corresponding to the frequency of the reference signals.

The invention is also described throughout for convenience in terms of vertical scan interferometry (VSI; i.e., the process of producing an interferogram by a mechanical scan). However, the invention is intended to include any method that produces interference fringes by changing the optical path difference between a test and a reference beam, such as, for example, polarization shifting methods. Accordingly, the invention may be practiced with a conventional vertical scanning interferometer, such as shown schematically in FIG. 4 (wherein x and y define the plane of the test surface and z defines the direction of the vertical scan). The interferometer 10 comprises a broadband (such as white-light) source 12 directing a light beam L through illuminating optics 14 toward a beam-splitter 16 that reflects the light in the direction of a test surface S. The light reflected by the beam-splitter 16 passes through a microscope objective 18 that focuses it on the test surface S. The objective incorporates an interferometer 20, such as Mirau, comprising a beam-splitter 22 and a reference mirror 24 adapted for a large-range relative movement (hundreds of microns) with respect to the surface S by utilizing a motorized translator (not shown).

During the scan of the objective 18 with respect to the surface S (or vice versa), two light beams are generated (one in reflection from the mirror 24 and another in reflection from the surface S) to produce interference fringes as a result of the optical path difference between the reference mirror 24 and the surface S. The portions of light reflected from the reference mirror and the surface propagate back through the objective 18 and further through the beam-splitter 16 towards a CCD detector 26. Appropriate electronic components (not shown) are provided to transmit the digitized irradiance data D generated by the detector 26 for further processing according to the invention as detailed below. Typically, the interferometer is additionally equipped with a calibrating arm (not shown) employing a single-wavelength light source for calibrating the scanning process.

Figure 5:
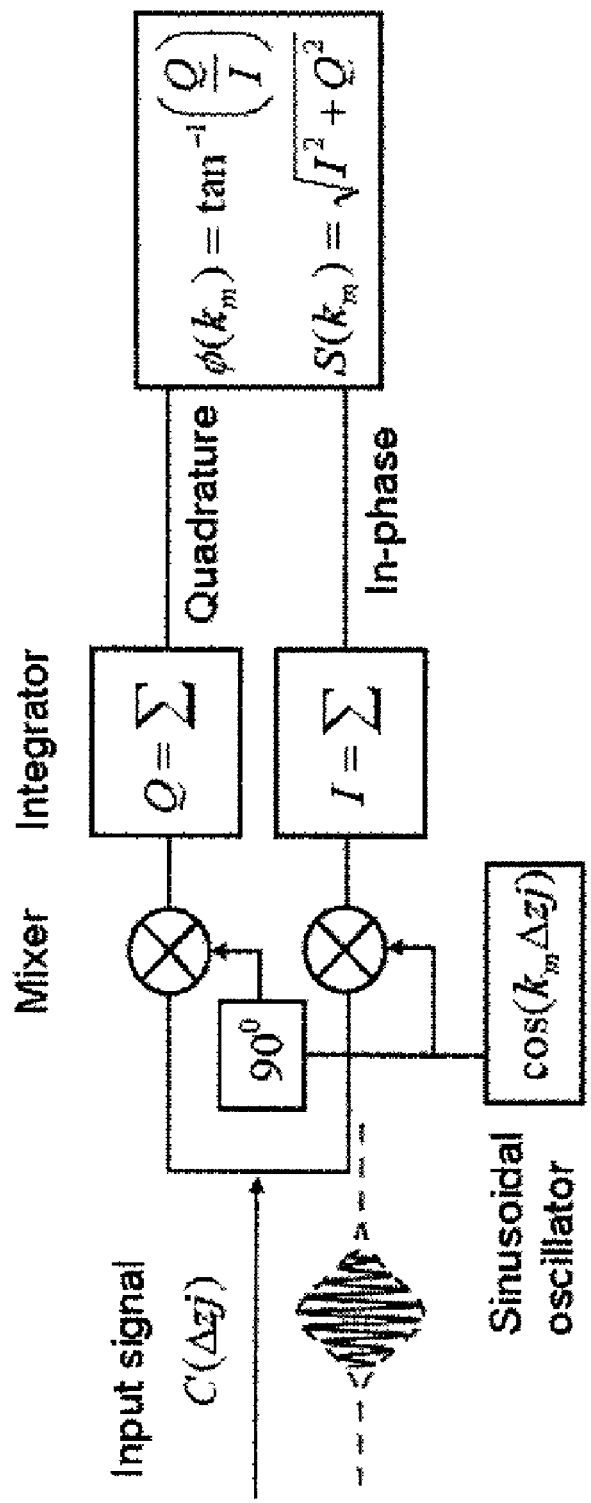
FIG. 5 is a block diagram of the in-phase/in-quadrature demodulation technique of the invention.

The in-phase/in-quadrature demodulation concept of the present invention is best illustrated by the block diagram of FIG. 5. The input signal $C(\Delta zj)$ (i.e., the sequence of correlogram data acquired during the interferometric scan) is directed into two paths. In one path, the signal is mixed with a sinusoidal oscillator operating at a given spatial frequency $k_m$ and then integrated to give a mixed signal output defined as an in-phase signal I. In the other path, the input signal is mixed with a sinusoidal oscillator with the same spatial frequency of $k_m$ but with a relative phase shift of 90 degree (that is, in quadrature) and then integrated to give a mixed signal output defined as a quadrature signal Q. According to the invention, the amplitude and phase of the spatial-frequency component $k_m$ are obtained from the signals I and Q from the equations $$S(k_m) = \sqrt{I^2 + Q^2} \text{ and} \tag{7}$$

$$\phi(k_m) = tg^{-1}\left(\frac{Q}{I}\right). \tag{8}$$

To appreciate the above, it is noted that the in-phase and in-quadrature reference sinusoidal oscillators can be written in general form as $$R_I(z) = \cos(k_m z) \text{ and} \tag{9}$$

$$R_Q(z) = \sin(k_m z), \tag{10}$$

where z is scan position and $k_m$ is the spatial-frequency component of interest. It can be assumed that the input signal $C(z)$ [as well as its discrete signal $C(\Delta zj)$] is composed of a sinusoidal component of frequency $k_m$ and many other spatial frequency components n within a bandwidth of $\Delta k$, i.e.

$$C(z) = A_m \cos(k_m z + \theta_m) + \Sigma_{n \neq m} A_n \cos(k_n z + \theta_n), \tag{11}$$

where $A_m$, $A_n$, $\theta_m$ and $\theta_n$ are values of amplitude and phase, respectively, of the correlogram signal. Therefore, mixing the input signal with the in-phase reference oscillator, Equation 11 becomes $$C(z) \times R_I(z) = A_m \cos(k_m z + \theta_m)\cos(k_m z) + \tag{12}$$

$$\sum_{n \neq m} A_n \cos(k_n z + \theta_n)\cos(k_m z)$$

$$= \frac{1}{2}A_m \cos(\theta_m) + \frac{1}{2}A_m \cos(2k_m z + \theta_m) +$$

$$\sum_{n \neq m} A_n \cos(k_n z + \theta_n)\cos(k_m z)$$

Similarly, mixing the input signal with the in-quadrature reference oscillator, Equation 11 becomes $$C(z) \times R_Q(z) = A_m \cos(k_m z + \theta_m)\sin(k_m z) + \tag{13}$$

$$\sum_{n \neq m} A_n \cos(k_n z + \theta_n)\sin(k_m z)$$

$$= -\frac{1}{2}A_m \sin(\theta_m) + \frac{1}{2}A_m \sin(2k_m z + \theta_m) +$$

$$\sum_{n \neq m} A_n \cos(k_n z + \theta_n)\sin(k_m z)$$

Note that the integration of all the AC terms in the I and Q signals reduces to zero because the integrals of both cosine and sine approximate zero over a range of n cycles where n>>1. [That is, the mean value of sin(x) and cos(x) over a large x range nears zero.] Thus, because $\cos(k_m z)$ and $\sin(k_n z)$ are orthogonal when $k_m$ is not equal to $k_n$, the integral of their product goes to zero. Therefore, the products of integration I and Q become $$I = \int_0^\infty C(z) \times R_I(z)\,dz = \frac{L}{2}A_m \cos(\theta_m) \tag{14}$$

$$Q = \int_0^\infty C(z) \times R_Q(z)\,dz = \frac{L}{2}A_m \sin(\theta_m)$$

where L is the length of the correlogram (i.e., the length of the scan that produced it, which, in the case of a scanning interferometer, is equal to $N\Delta z$).

Thus, the amplitude and phase of the frequency component $k_m$ in the correlogram may be obtained from the relations $$S(k_m) = \sqrt{I^2 + Q^2} = \frac{L}{2}A_m \text{ and} \tag{15}$$

$$\phi(k_m) = tg^{-1}\left(\frac{Q}{I}\right) = \theta_m. \tag{16}$$

Figure 6:
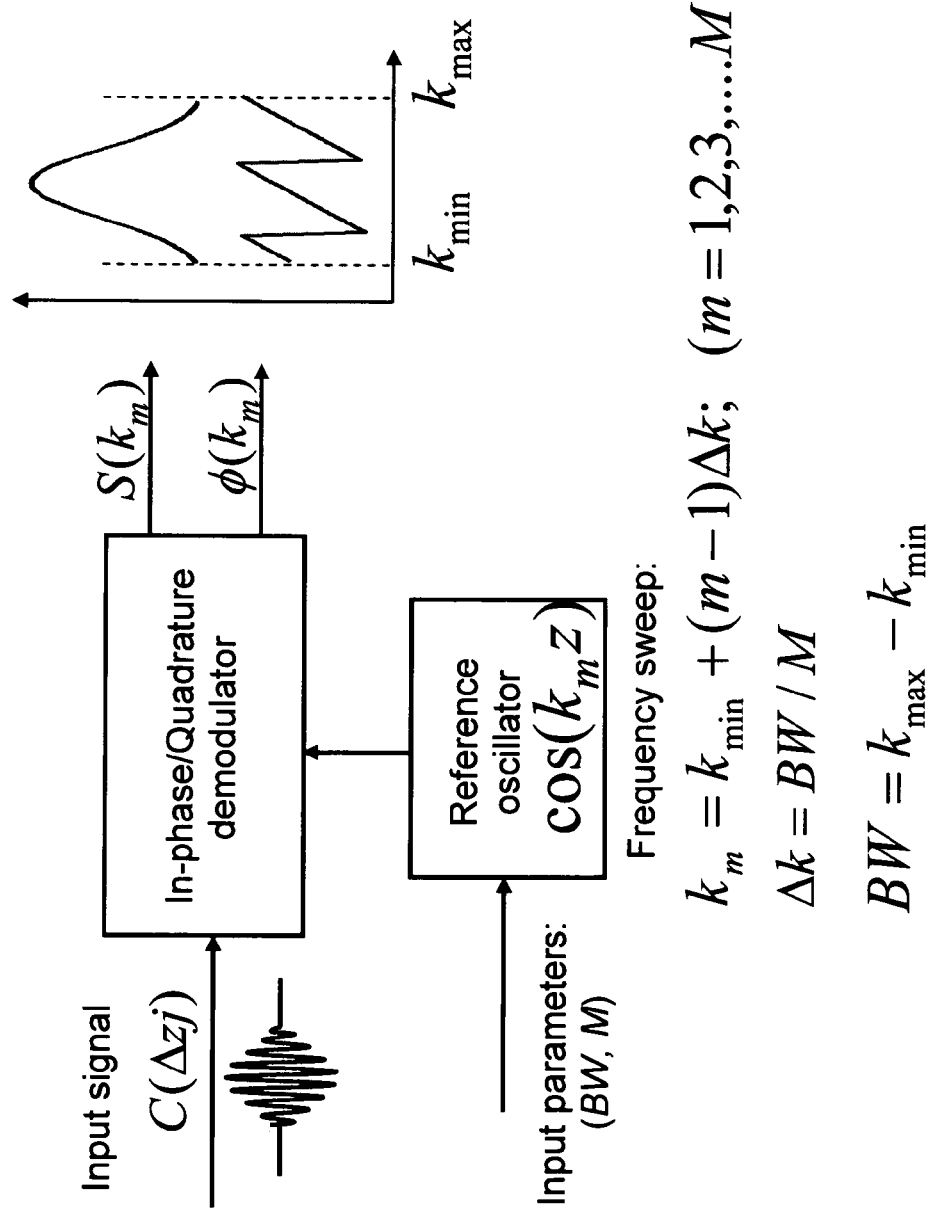
FIG. 6 is a block diagram of a digital spectrometer using the in-phase/in-quadrature demodulation technique of the invention.

FIG. 6 shows the block diagram of a digital spectrometer using the in-phase/in-quadrature demodulation technique of the invention. The frequency of the reference oscillator determines the frequency component of the output signal. Therefore, by sweeping the reference frequency across the bandwidth of the input signal (the correlogram signal), the spectral amplitude and spectral phase of the input signal can be obtained. The bandwidth, BW, and the number of the spectral sampling point, M, are the input parameters and they determine the spectral frequency resolution (as seen from the illustration in FIG. 6).

Referring back to FIG. 4, the in-phase/in-quadrature demodulation processing of the interferometric signals acquired by the detector 26 may be implemented by mixing the interferometric signals D with the sinusoidal in-phase and in-quadrature signals i and q, respectively, produced by a signal generator 30. Alternatively, two sinusoidal oscillators set to operate in-quadrature could be used, or the in-phase and in-quadrature reference signals could be generated in software. The signals D, i and q are mixed in a mixer 32 and the mixed signals Di, Dq are integrated in an integrator 34 to produce the outputs I and Q required to calculate amplitude S and phase 0 (Equations 15 and 16) in a data processor 36. Those skilled in the art will readily appreciate that all these steps may be carried in part or totally in equivalent manner using software.

Figure 7:
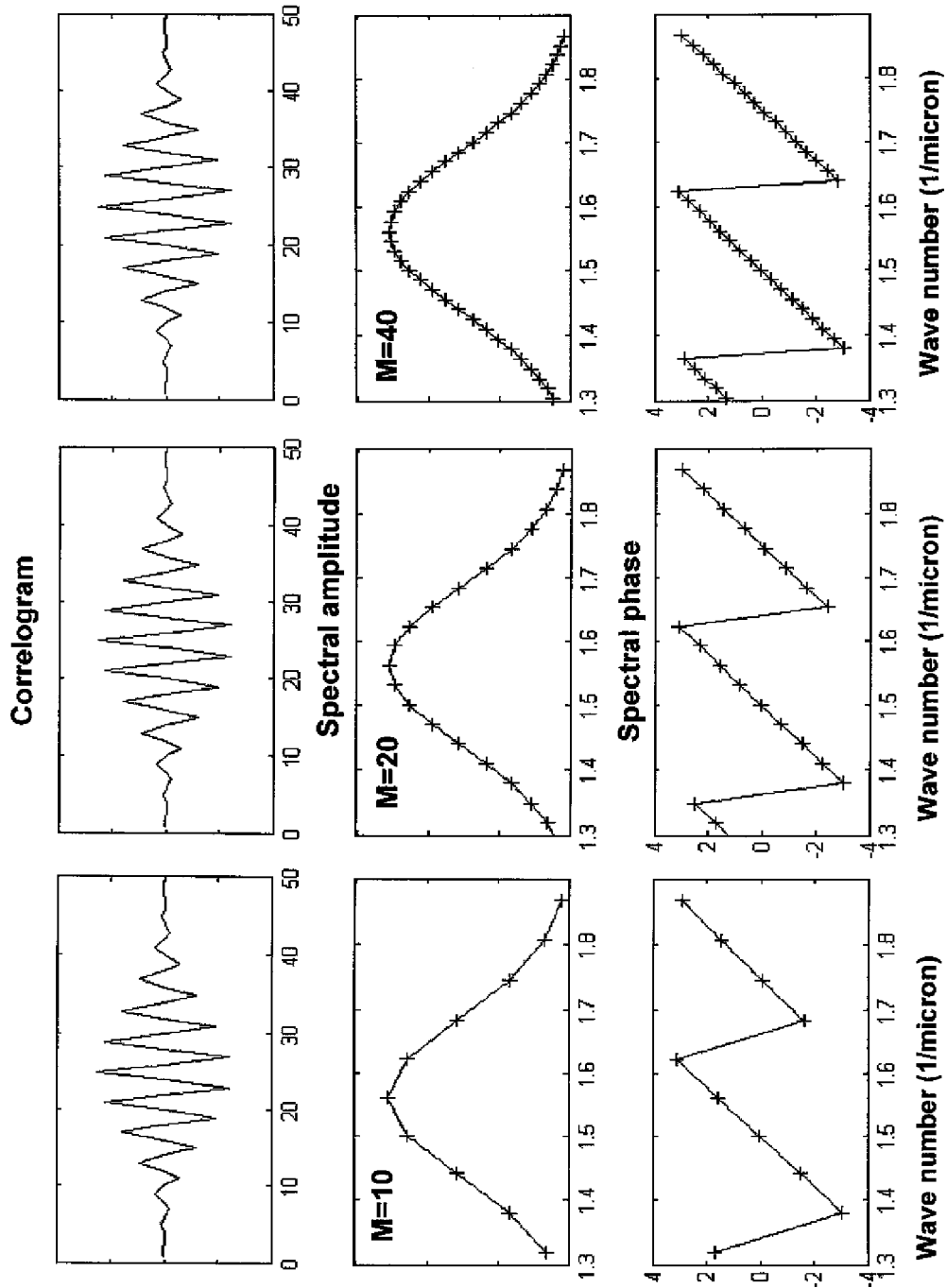
FIG. 7 shows the amplitude and phase spectra calculated using the procedure of the invention from 50-frame-long correlograms with 10 ($\Delta k=0.06/\mu m$), 20 ($\Delta k=0.03/\mu m$), and 40 ($\Delta k=0.015/um$) spectral points within a bandwidth of 0.6/$\mu m$.

One of the advantages of using the in-phase/in-quadrature demodulation of the invention is that the frequency resolution $\Delta k$ is independent of the length of the input data sequence, so that redundant data collection and processing can be significantly reduced. FIG. 7 shows the amplitude and phase spectra calculated from a 50-frame-long correlogram with 10 ($\Delta k=0.06/\mu m$), 20 ($\Delta k=0.03/\mu m$) and 40 ($\Delta k=0.015/\mu m$) spectral points within a bandwidth of $0.6/\mu m$.

Figure 8:
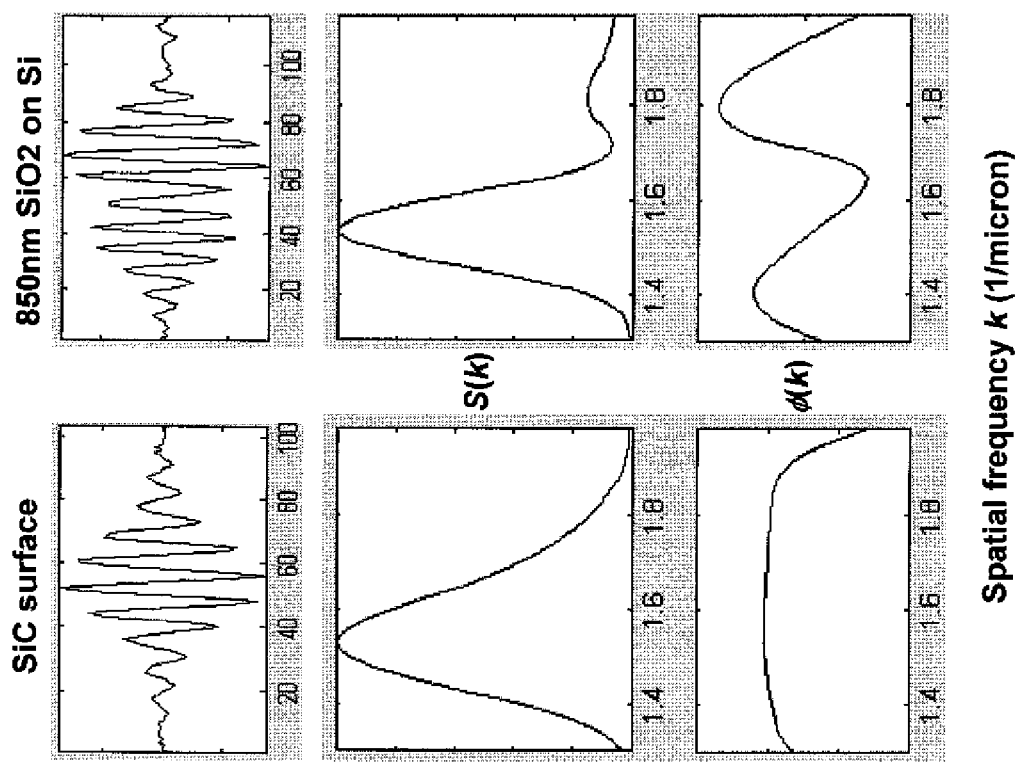
FIG. 8 illustrates the correlograms and the corresponding spectral amplitude and spectral phase plots obtained with the technique of the invention from a SiC surface and from an 850 nm SiO2 thin film on a Si substrate.

FIG. 8 illustrates the results obtained with the technique of the invention from two different sample surfaces. Part A shows the correlograms obtained by scanning a SiC surface and an 850 nm SiO2 thin film on a Si substrate. Part B shows the spectral amplitude plots corresponding to the respective correlograms. Part C shows the spectral phase plots corresponding to the correlograms (only the nonlinear term of the spectral phases were plotted because only this term carries information related to characterization of the material).

Thus, a novel procedure had been described to extract useful spectral data from a correlogram with materially fewer data frames than previously possible. In addition, the technique allows the generation of spectral information at any spatial frequency of interest. Therefore, the method of the invention is advantageously faster than the prior art and targeted to specific results. Once the spectral amplitude and spectral phase of a correlogram are available, these data may be used in conventional manner to calculate properties of the media, including height, as is well known in the art.

While the invention has been shown and described herein with reference to what is believed to be the most practical embodiment, it is recognized that departures can be made within the scope of the invention. For example, the reference sinusoidal signals combined with the correlogram are ideally in perfect quadrature (i.e., phase-shifted by exactly 90 degrees); however, substantial quadrature is sufficient to extract amplitude and phase information for spectral analysis of the correlogram. Similarly, the functions of generating the reference sinusoidal signals, mixing them with the interference signals, integrating the mixed signals and combining the integrated outputs to calculate amplitude and/or phase may be carried out in hardware, software, or a mixture of both. Therefore, the invention is directed at all such implementations.

One skilled in the art would also recognize that the integrated mixed in-phase and in-quadrature signals of the invention can be used advantageously to calculate other spectral functions, in addition to amplitude and phase, as illustrated herein. Therefore, the invention is not to be limited to the details disclosed herein but is to be accorded the full scope of the claims so as to embrace any and all equivalent processes and products.

The invention claimed is:

1. A method for extracting spectral information from an interferogram produced by a plurality of interference signals, the method comprising the following steps:
   mixing the interference signals with in-phase sinusoidal signals having a predetermined spatial frequency and integrating a resulting in-phase mixed signal, thereby producing an in-phase integrated output;
   mixing the interference signals with in-quadrature sinusoidal signals having said predetermined spatial frequency and a relative phase shift of substantially 90 degrees and integrating a resulting in-quadrature mixed signal, thereby producing an in-quadrature integrated output;
   combining said in-phase and in-quadrature integrated outputs to calculate a spectral function corresponding to said predetermined spatial frequency.

2. The method of claim 1, wherein said spectral function is amplitude.

3. The method of claim 1, wherein said spectral function is phase.

4. The method of claim 1, further comprising repeating each step for a range of spatial frequencies, thereby producing corresponding spectral function data.

5. The method of claim 2, further comprising repeating each step for a range of spatial frequencies, thereby producing corresponding spectral amplitude data.

6. The method of claim 3, further comprising repeating each step for a range of spatial frequencies, thereby producing corresponding spectral phase data.

7. Interferometric apparatus for extracting spectral information from an interferogram produced by a plurality of interference signals, said apparatus comprising:
   a signal generator for generating in-phase sinusoidal signals having a predetermined spatial frequency and in-quadrature sinusoidal signals having said predetermined spatial frequency and a relative phase shift of substantially 90 degrees;
   a signal mixer for mixing the interference signals with said in-phase sinusoidal signals and the interference signals with said in-quadrature sinusoidal signals, thereby producing an in-phase mixed output and an in-quadrature mixed output;
   an integrator for integrating the in-phase mixed output and the in-quadrature mixed output, thereby producing an in-phase integrated output and an in-quadrature integrated output; and
   a processor including a computer readable medium storing instructions for combining said in-phase and in-quadrature integrated outputs to calculate a spectral function corresponding to said predetermined spatial frequency.

8. The apparatus of claim 7, wherein said spectral function is amplitude.

9. The apparatus of claim 7, wherein said spectral function is phase.

10. The apparatus of claim 7, further including an interferometer to produce said plurality of interference signals.

11. The apparatus of claim 10, wherein said interferometer is a vertical scanning interferometer.

12. A computer program product encoded in an information storage medium and usable with a programmable computer processor, said product being programmed to mix interference signals with in-phase sinusoidal signals having a predetermined spatial frequency and integrate a resulting in-phase mixed signal, thereby producing an in-phase integrated output; to mix the interference signals with in-quadrature sinusoidal signals having said predetermined spatial frequency and a relative phase shift of substantially 90 degrees and integrate a resulting in-quadrature mixed signal, thereby producing an in-quadrature integrated output; and to combine said in-phase and in-quadrature integrated outputs to calculate a spectral function corresponding to said predetermined spatial frequency.

13. The product of claim 12, wherein said spectral function is amplitude.

14. The product of claim 12, wherein said spectral function is phase.

\* \* \* \* \*